Figure 1:
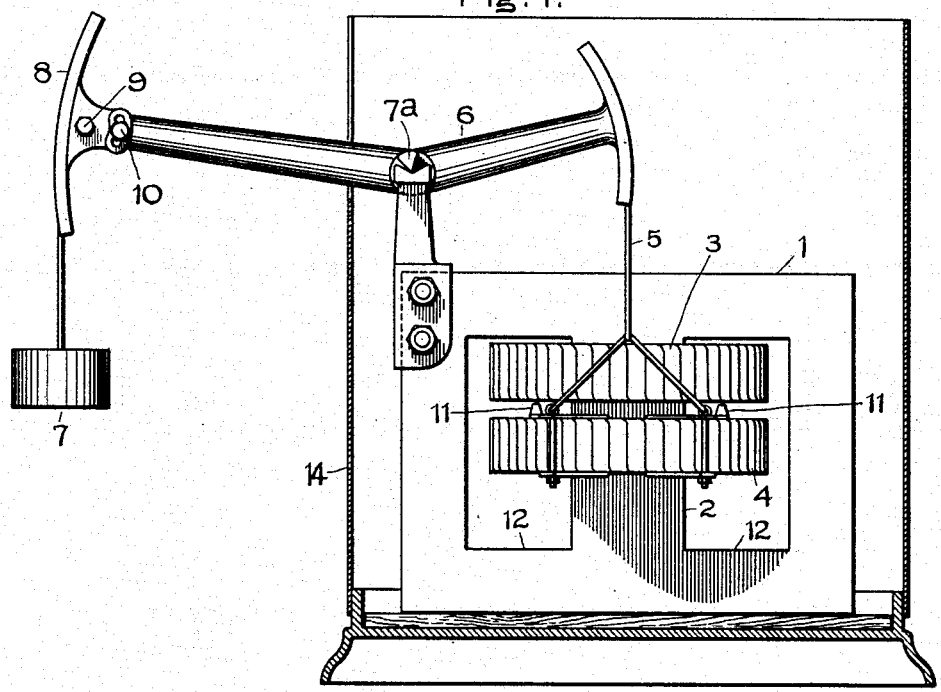

No. 676,344. Patented June 11, 1901.
E. THOMSON.
REGULATING DEVICE FOR ALTERNATING CURRENT CIRCUITS.
(Application filed Jan. 29, 1900.)
(No Model.)

Witnesses.
Lewise Abell.
A. F. Macdonald.

Inventor.
Elihu Thomson.
by Albert G. Davis
Atty.

THE NORRIS PETERS CO., PHOTO-LITHO., WASHINGTON, D. C.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

REGULATING DEVICE FOR ALTERNATING-CURRENT CIRCUITS.

SPECIFICATION forming part of Letters Patent No. 676,344, dated June 11, 1901.

Application filed January 29, 1900. Serial No. 3,101. (No model.)

*To all whom it may concern:*

Be it known that I, ELIHU THOMSON, a citizen of the United States, residing at Swampscott, county of Essex, State of Massachusetts, have invented certain new and useful Improvements in Regulating Devices for Alternating-Current Circuits, (Case D, No. 1,088,) of which the following is a specification.

My present invention relates to constant-current-regulating apparatus, and more particularly to that type making use of relatively movable windings.

It comprises certain improvements whereby the range of relative movement of the coils of such an apparatus may be considerably reduced, thereby effecting a large saving in iron and securing a much more compact structure.

According to one mode of carrying my invention into operation I make use of a constant-current transformer and allow relative movement of the primary and secondary windings only within certain limits between the maximum and minimum load points of the apparatus. Thus, for example, the coils may be allowed to move while the load varies from the maximum down to one-third of the maximum value or, on the other hand, from a minimum value up to two-thirds of the full load. In some cases it may be permissible to allow a motion between the coils only between one-third and two-thirds of the full load. By thus limiting the movement of the coils the iron core may be shortened to correspond, thus reducing the bulk of the apparatus and effecting a commensurate saving in size. When the coils of the transformer are allowed to have relative movement, the apparatus will have a very close regulation for constant current; but when the coils are fixed with respect to each other only an approximation of constant-current regulation is secured, the apparatus then operating in the same manner as the well-known leakage-transformer for securing constant current.

The selection of a particular range of load over which the coils of the transforming apparatus are allowed to have relative movement depends on the particular circumstances of each case. Thus if the circuit supplied by the transforming apparatus is one which is generally underloaded, then arrangements may be made to prevent movement of the coils of the transformer as the load approaches a maximum. In this case the regulation in the range near the maximum-load point is somewhat imperfect; but as this range is infrequently reached it is not a matter of serious importance in comparison with the saving effected in the transforming apparatus. If, on the other hand, the load is seldom as low as one-third of its full value, then movement between the coils may be prevented during a range between no load and one-third of full load.

It may happen that the load seldom approaches either a maximum or a minimum value, but remains usually at some intermediate point. In this case a still more limited movement of the transformer-coils may be secured, no movement being permitted in this case between limits represented by loads of a certain value above the minimum and below the maximum.

From this brief reference to the nature of my invention it will be seen that a regulating device operated in accordance with my invention works at some values of load as a leakage-transformer and regulates at other values of load by means of relative movement between the primary and secondary coils.

The points of novelty in my invention will be particularly pointed out in the claims appended hereto, while its specific nature and mode of operation will be best understood by reference to the following description, taken in connection with the accompanying drawings.

Figure 2:
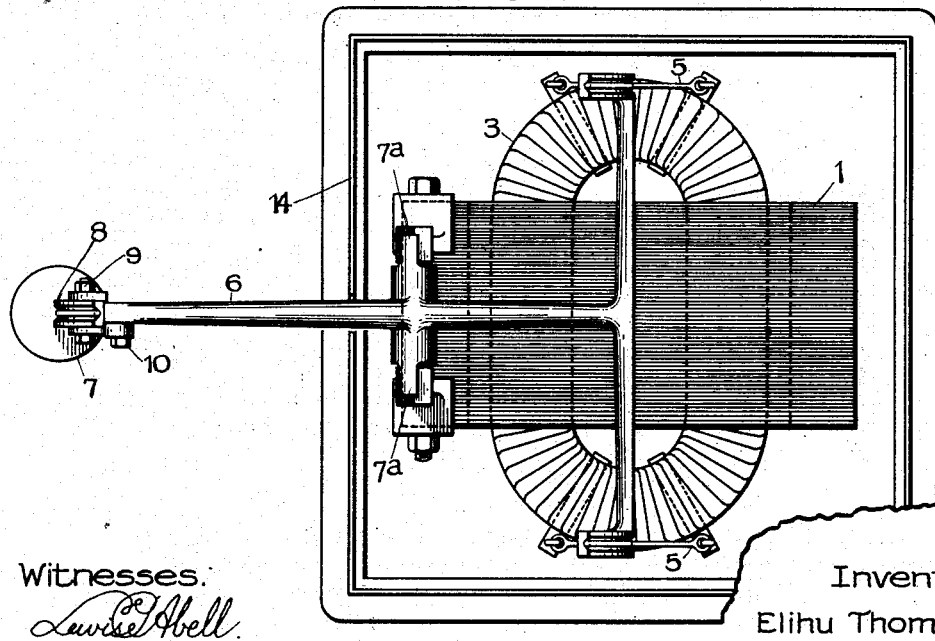

In the drawings, Figure 1 represents an elevation of a transformer embodying my invention, while Fig. 2 is a plan view of the same.

The apparatus thus shown differs little from constant-current transformers having movable coils and now well known in the art, except that it is so designed as to prevent a relative movement between the coils during a certain range of load.

The core 1 of the transformer is of a usual type, having a central section 2, about which the transformer-coils are placed. In the instance shown one of these coils 3 is fixed in position, while the other, 4, is movable relatively thereto by reason of its suspension by flexible connections 5 from one arm of a counterbalancing-lever 6. A weight 7 operates upon the other end of the lever and is arranged to overbalance the weight of the coil 4. The lever 6 is mounted in any suitable manner so as to oscillate backward and forward in response to varying repulsion between the coils 3 and 4. As here shown, the lever 6 is mounted upon knife-edges $7^a$.

In order to vary the counterbalancing effect of the weight 7, its lever-arm may be changed by altering the position of the winding-surface carried by the lever 6 and to which the weight is connected. This may be done by rotating the winding-surface 8 about its pivotal connection 9 with the lever 6 and then securing the parts in position by means of the clamping-nut 10.

The transforming apparatus may, if desired, be inclosed in a protecting-casing, (indicated generally by the numeral 14;) but as this constitutes no part of my present invention the nature of the details is unimportant.

It will be noted in Fig. 1 that stops 11, carried by one of the coils—as, for instance, the coil 4—prevent the two coils 3 and 4 from closely approaching each other. With this arrangement the apparatus operates as a leakage-transformer when the load approximates a maximum. Thus suppose the apparatus to be feeding arc-lights in series and that only one or two lights are in use. Under these circumstances the primary and secondary coils of the apparatus will be widely separated from each other. If now an additional number of lights are turned on, the first effect is to cause a temporary diminution in current. The repulsive effect between the coils decreases and the coils approach each other. As more and more lights are turned on the coils continue to approach until further movement is prevented by the stops 11. During this range of movement the current has a very close approximation to constancy. If now additional lights are cut into circuit, the current will decrease, but not in proportion to the decrease in impedance of the circuit, since as the secondary current decreases the leakage between the coils of the transformer also decreases, thus preventing a corresponding decrease in secondary electromotive force. The current thus approximates constancy; but the regulation is not quite as exact as that secured by movement between the coils. It is, however, sufficiently accurate for most purposes, reduces the amount of travel between the coils, and effects considerable saving in cost of construction, as before mentioned.

If it is desired that the apparatus operate as a leakage-transformer only as the load approaches a minimum, then the stops 11 may be dispensed with and the result secured by shortening up the center section 2 of the transformer-core, so that the movable coil 4 during its range of travel will reach its limit of movement before the underload point is reached. In this case the coils of the transformer will continue to separate from each other as the load is decreased, and this separation will continue until the coil 4 is brought up against the extensions 12 of the core. When this point is reached, the apparatus operates as a leakage-transformer if the load is still further reduced, and the current will rise somewhat above its normal value, but yet maintain a sufficient approximation to constancy for all practical purposes.

The construction last described may, if desired, be used in connection with the stops 11, in which case an approximate regulation is secured at both ends of the load, so to speak, and a more exact regulation at intermediate points. In this case the current increases above the normal as the load approaches the minimum and decreases at values of load near the maximum.

What I claim as new, and desire to secure by Letters Patent of the United States, is—

1. A constant-current transforming apparatus, comprising relatively movable primary and secondary coils, and means for preventing relative motion between the coils when the load approaches a maximum.

2. A constant-current transformer having relatively movable coils, and stops for limiting the approach of the coils.

3. A constant-current transformer, having relatively movable coils in inductive relation to each other, and means for preventing a close approach of the coils.

4. In a regulating apparatus, the combination of relatively movable coils in inductive relation to each other, means for allowing relative motion of the coils and at the same time opposing such motion by a continuously-applied force, and means for preventing such motion when the load approaches a maximum.

In witness whereof I have hereunto set my hand this 25th day of January, 1900.

ELIHU THOMSON.

Witnesses:
 DUGALD McKILLOP,
 ROBT. H. READ.